April 7, 1925.
C. J. RHODES
MECHANICAL BRAKE
Filed June 4, 1921
1,532,515
3 Sheets-Sheet 1
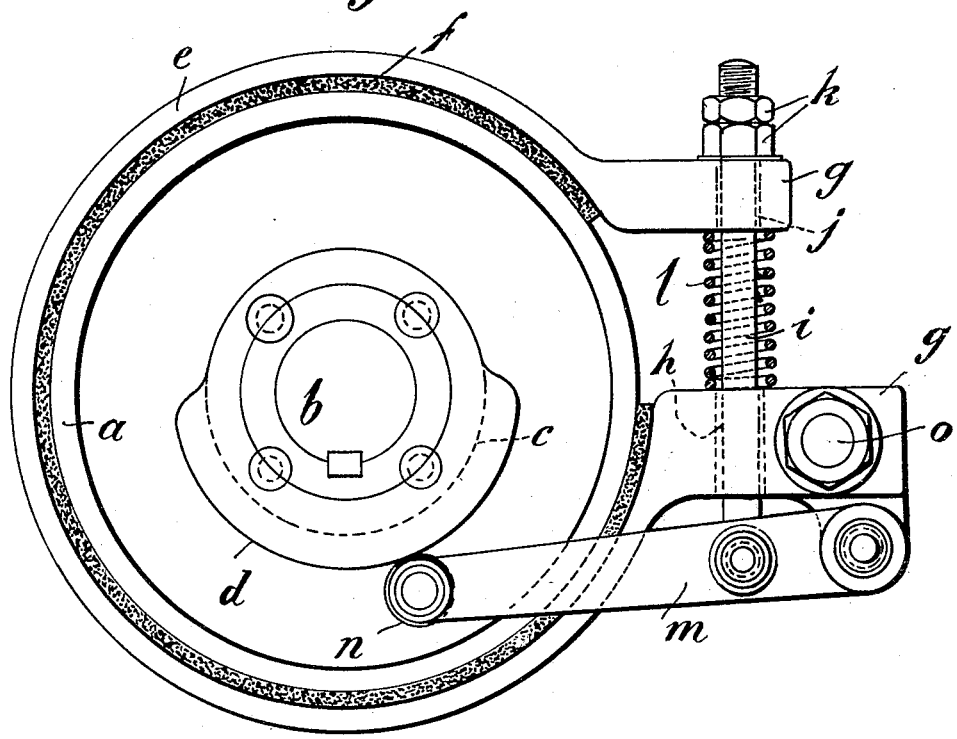
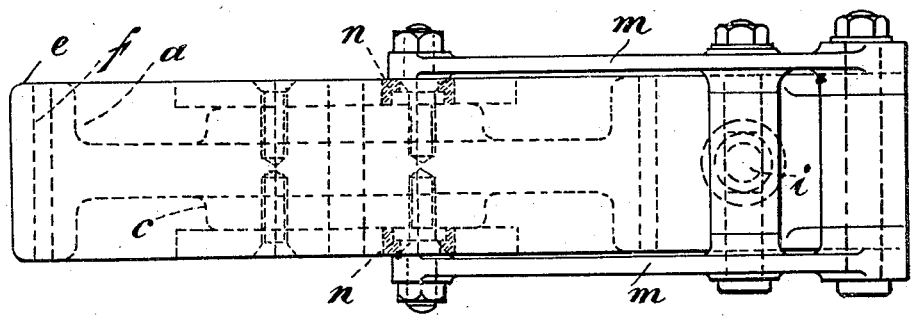
Inventor.
Charles Joseph Rhodes.
By B. Singer,
Atty.

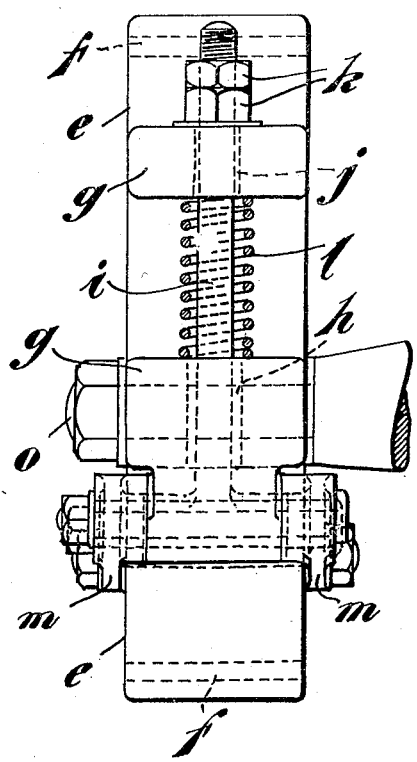

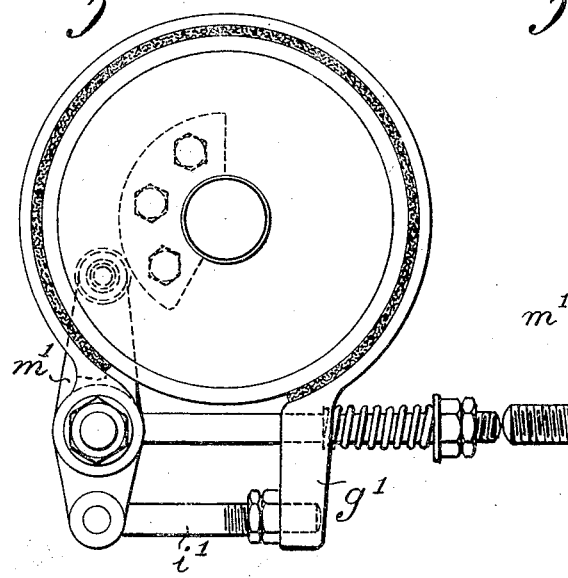
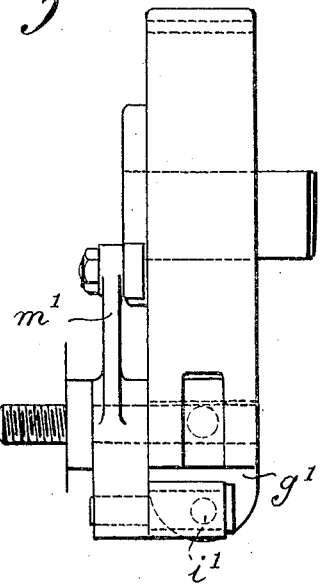

Patented Apr. 7, 1925.

1,532,515

UNITED STATES PATENT OFFICE.

CHARLES JOSEPH RHODES, OF PLEDWICK HOUSE, NEAR WAKEFIELD, ENGLAND.

MECHANICAL BRAKE.

Application filed June 4, 1921. Serial No. 475,022.

*To all whom it may concern:*

Be it known that I, CHARLES JOSEPH RHODES, a subject of the Kingdom of Great Britain, residing at Pledwick House, near Wakefield, in the county of York, England, have invented certain new and useful Improvements in Mechanical Brakes, of which the following is a specification.

This invention relates to a mechanical brake mechanism, of the type involving a brake drum, a cam rigidly secured to rotate with said brake drum, a substantially circular brake for said brake drum, lugs at the extremities of said brake, and a rod encircled by a coiled brake-actuating spring.

According to the present invention in this type of brake mechanism the said rod is coupled to a lever at a position intermediately of the ends of the latter, one end of said lever being adapted to cooperate with the cam and the other end of the lever being adapted to cooperate with one of the said lugs. The spring may be adapted to actuate the brake in release, or, alternatively, in engagement. In the former case, the spring may be located between the lugs at the ends of the substantially circular brake, and the rod may pass through both of these lugs. In a case in which the spring operates to engage the brake, the rod may be pivoted to one of the lugs, coaxially with the intermediate pivot of the lever, and said lever at its other end may cooperate with the other of the lugs.

The invention is applicable for use upon power presses, shearing machines, punching machines, angle benders, general metal working machinery, and the like for preventing sudden reverse motion.

Figure 1 is an elevation of an embodiment of the present invention.

Figure 2 is a side elevation of the embodiment shown in Figure 1.

Figure 3 is a plan of the embodiment shown in Figures 1 and 2.

Figure 4 illustrates in axial elevation a modification.

Figure 5 illustrates in side elevation the modification shown in Figure 4.

In a convenient embodiment of the present invention, a brake drum $a$ is provided composed of plate sections and adapted appropriately to be supported or keyed upon the shaft $b$ of the machine to which the brake is intended to be fitted, said plate sections being provided with bosses $c$ to which are secured by screws or the like cam-shaped discs $d$.

This drum $a$ is encircled by a band consisting of a metal strap $e$ lined with appropriate brake lining $f$, said strap $e$ being furnished at each extremity with a lug or projection $g$, one of which lugs or projections is appropriately anchored to the body of the machine, as for instance by a stud $o$. In this lug a perforation $h$ is provided through which passes a rod $i$, said rod being adapted also to pass through a perforation $j$ in the lug at the other extremity of the brake band $e$, and beyond such other lug the rod $i$ is screwed and fitted with lock nuts $k$. Between the projections $g$ appertaining to the brake band $e$ a coiled compression spring $l$ is provided.

On the side of the first-mentioned lug remote from that on which the other lug occurs, the rod $i$ is pivotally connected to an arm $m$ which latter is pivotally connected to the first-mentioned lug, and said arm $m$ extends and carries a roller $n$ which engages with the cam $d$ which is rigidly secured to or adapted to rotate with the brake drum $a$. Advantageously this arm $m$ is of U-form consisting of a pivotal portion having dual limbs extending one on each side of the brake drum $a$, each of said limbs carrying a roller $n$ which engages with a cam plate $d$ secured to the respective side of the brake drum $a$.

Rotation of the brake drum $a$ causes the brake to be engaged during any appropriate part of the revolution and to be disengaged under the influence of the spring $l$ during the remaining part of the revolution. The period of braking may be determined according to the amount of dwell provided by the cam disc or discs $d$.

The effective pressure of the brake may be adjusted by tightening or loosening the lock nuts $k$ upon the above-mentioned stem $i$.

The modifications necessary to permit of the positive disengagement of the brake and engagement of the rod under the influence of the spring $l$ will be understood from the foregoing description of the embodiment in which the brake is positively engaged.

The embodiment shown in Figures 4 and 5 differs from that shown in Figures 1, 2 and 3 in that the brake strap is pivoted at $o$ coaxially with the axis of pivotal movement of the lever $m^1$, such lever $m^1$ being coupled at its outer extremity to the rod $i^1$, which in turn is coupled to the lug $g^1$, appertaining to the other extremity of the brake strap.

What I claim as my invention and desire to secure by Letters Patent is:—

1. A shaft, a brake drum thereon, having a cam, a brake band bearing on the drum and having ends arranged at one side of the drum, a lever connected at one end to one of said ends and having means at the other end to bear on said cam, a member connecting the intermediate portion of said lever to the other end of the brake band, and a spring active to engage said lever with said cam.

2. A shaft, a brake drum thereon, having a cam, a brake band bearing on the drum and having ends arranged at one side of the drum, a lever connected at one end to one of said ends and having means at the other end to bear on said cam, a rod attached to said lever at a point intermediate its ends and connected to the other end of the brake band, and a spring arranged between the ends of the brake band and active to engage said lever with said cam.

In witness whereof I have hereunto set my hand.

CHARLES JOSEPH RHODES.